(12) United States Patent
Lee et al.

(10) Patent No.: US 8,976,148 B2
(45) Date of Patent: Mar. 10, 2015

(54) TOUCH SENSING APPARATUS AND DATA PROCESSING METHOD THEREOF

(75) Inventors: Hyun Suk Lee, Gyunggi-do (KR); Sang Ho Lee, Gyunggi-do (KR); Tah Joon Park, Gyunggi-do (KR); Kang Joo Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 368 days.

(21) Appl. No.: 13/602,678

(22) Filed: Sep. 4, 2012

(65) Prior Publication Data

US 2013/0321327 A1 Dec. 5, 2013

(30) Foreign Application Priority Data

May 30, 2012 (KR) .................. 10-2012-0057387

(51) Int. Cl.
*G06F 3/041* (2006.01)
(52) U.S. Cl.
USPC ........................................ 345/174; 345/173
(58) Field of Classification Search
USPC .................. 345/156, 173, 174, 178, 179; 178/18.01, 18.06, 19.01, 19.03
See application file for complete search history.

(56) References Cited

U.S. PATENT DOCUMENTS

| | | | | |
|---|---|---|---|---|
| 8,493,356 B2* | 7/2013 | Joharapurkar et al. | ....... | 345/174 |
| 8,508,504 B2* | 8/2013 | Mo | ............................... | 345/174 |
| 2011/0261007 A1 | 10/2011 | Joharapurkar et al. | | |
| 2012/0050574 A1* | 3/2012 | Choi | ..................... | 348/231.99 |
| 2012/0068958 A1* | 3/2012 | Chen | ............................. | 345/174 |
| 2012/0146936 A1* | 6/2012 | Liu | ............................. | 345/174 |
| 2012/0280933 A1* | 11/2012 | Lai | ................................ | 345/174 |
| 2013/0061144 A1* | 3/2013 | Eppolito | ....................... | 715/716 |
| 2013/0063390 A1* | 3/2013 | Kwon et al. | .................. | 345/174 |
| 2013/0162583 A1* | 6/2013 | Simmons et al. | ............. | 345/174 |
| 2013/0169586 A1* | 7/2013 | Lan et al. | ...................... | 345/174 |
| 2013/0257784 A1* | 10/2013 | Vandermeijden et al. | .... | 345/174 |

FOREIGN PATENT DOCUMENTS

| | | |
|---|---|---|
| JP | 2011-175452 | 9/2011 |
| JP | 2011-198368 | 10/2011 |
| KR | 10-2012-0018252 | 3/2012 |

* cited by examiner

*Primary Examiner* — Joe H Cheng

(57) ABSTRACT

There are provided a data processing method and a touch sensing apparatus. The data processing method includes (a) obtaining a plurality of pieces of sensing data according to one or more touch inputs; (b) selecting one or more pieces of temporary reference data having the minimum difference value between adjacent other pieces of sensing data; (c) calculating difference values between the one or more pieces of temporary reference data; (d) calculating an N number of difference values between the N number of pieces of sensing data obtained from the nodes included in the Kth row and an N number of pieces of sensing data obtained from nodes included in the K-1th row; and (e) determining the temporary reference data having a relatively small representative value as reference sensing data of the Kth row.

15 Claims, 10 Drawing Sheets

TOUCH SENSING APPARATUS AND DATA PROCESSING METHOD THEREOF

CROSS-REFERENCE TO RELATED APPLICATIONS

This application claims the priority of Korean Patent Application No. 10-2012-0057387 filed on May 30, 2012, in the Korean Intellectual Property Office, the disclosure of which is incorporated herein by reference.

BACKGROUND OF THE INVENTION

1. Field of the Invention

The present invention relates to a touch sensing apparatus for generating reference sensing data for respective pieces of data among a plurality of pieces of data in consideration of an influence of electrical noise or foreign materials such as water droplets falling onto a panel and calculating effective sensing data from the reference sensing data, thereby precisely determining a touch input, and a data processing method thereof.

2. Description of the Related Art

Touch sensing apparatuses such as a touch screen, a touch pad, and the like, are input apparatuses attached to display apparatuses and provide users with intuitive input methods, and recently have been applied to various electronic devices such as cellular phones, personal digital assistants (PDA), navigation devices, and the like. In particular, as a demand for smart phones has recently increased, touch screens have been increasingly employed as touch sensing apparatuses capable of providing various user input methods in a limited form factor.

Touch screens applied to portable devices can be classified into resistance-type touch screens and capacitance-type touch screens according to methods of sensing a touch input. Capacitance-type touch screens can advantageously have long lifetime and easily implement various input methods and gestures, and thus applications thereof have been increasing. In particular, a multi-touch interface may be easier to implement in capacitance-type touch screens than in resistance-type touch screens, thus having a wide range of applications in devices such as smart phones.

Touch screen apparatuses may include a panel unit and a controller for determining a touch input. The controller converts a change in capacitance generated in the panel unit according to the touch input into sensing data and thus determines the touch input. The controller may determine the touch input from the sensing data indicating a difference in the change in capacitance between a state in which no touch input occurs and a state in which the touch input occurs. Thus, in a case in which reference sensing data indicating the state in which no touch input occurs, changes due to electrical noise or impacts on the panel unit such as those of water droplets, the controller may not precisely determine the touch input.

In the following related art documents, Patent Document 1 relates to a touch screen apparatus and a driving apparatus of a touch panel, and discloses determining a touch input by using a difference in data values between sensing channels Y1~Yn of a touch screen but does not disclose considering reference data with respect to sensing data corresponding to a adjacent driving channel. Patent Document 2 relates to a touch sensor apparatus and merely discloses determining an effective touch input based on a difference value of adjacent sensing channels but does not disclose considering reference data with respect to sensing data corresponding to an adjacent driving channel.

RELATED ART DOCUMENT (Patent Document 1) Korean Patent Laid-Open Publication No. KR 10-2012-0018252
(Patent Document 2) Japanese Patent Laid-Open Publication No. JP 2011-175452

SUMMARY OF THE INVENTION

An aspect of the present invention provides a method of precisely calculating effective sensing data by using reference sensing data obtained from adjacent first electrodes among the first electrodes to which a driving signal is applied. Here, reference sensing data with respect to sensing data obtained by applying a driving signal to a specific first electrode is calculated by comparing the reference sensing data with previously determined reference sensing data with respect to another adjacent first electrode, thereby precisely determining effective sensing data.

According to an aspect of the present invention, there is provided a data processing method including: (a) obtaining a plurality of pieces of sensing data according to one or more touch inputs from an M×N (M and N being positive integers) number of nodes included in a panel unit; (b) selecting one or more pieces of temporary reference data having the minimum difference value between adjacent pieces of sensing data gathered in a row direction from among an N number of pieces of sensing data obtained from the nodes included in a Kth (K is a positive integer greater than 1 and less than or equal to M) row; (c) calculating difference values between the one or more pieces of temporary reference data selected from the Kth row and reference sensing data in a K-1th row; (d) calculating an N number of difference values between the N number of pieces of sensing data obtained from the nodes included in the Kth row and an N number of pieces of sensing data obtained from nodes included in the K-1th row based on the difference values calculated in operation (c); and (e) determining the temporary reference data having a relatively small representative value as reference sensing data of the Kth row by calculating a representative value of the N number of difference values with respect to respective pieces of temporary reference data among the one or more pieces of temporary reference data.

The operation (a) may include: sequentially applying predetermined driving signals to respective rows among an M number of rows; detecting a plurality of changes in capacitance from an N number of nodes included in the row to which the driving signals are applied; and generating the plurality of pieces of sensing data based on the plurality of changes in capacitance.

The operation (c) may include: calculating difference values between the one or more pieces of temporary reference data selected from each row and reference sensing data determined for other rows adjacent in a column direction.

The operation (e) may include: calculating a sum of the N number of difference values or a root mean square (RMS) value, as the representative value for respective pieces of temporary reference data among the one or more pieces of temporary reference data.

The method may further include: (f) generating effective sensing data of the Kth row by subtracting the reference sensing data of the Kth row determined in operation (e) from respective pieces of sensing data of the Kth row.

The operations (b) through (f) may be performed for respective rows among the M number of rows.

The method may further include: (g) determining the one or more touch inputs by using the effective sensing data for respective rows among the M number of rows.

According to another aspect of the present invention, there is provided a data processing method including: (a) applying a driving signal to one of an M number of first electrodes extending in a first axial direction; (b) obtaining an N number of pieces of sensing data extending in a second axial direction so that the N number of second electrodes cross the M number of first electrodes to which the driving signal is applied; (c) selecting one or more pieces of temporary reference data having the minimum difference value between adjacent pieces of sensing data gathered in first axial direction for respective pieces of sensing data among the N number of pieces of sensing data obtained in operation (b); (d) calculating difference values between pieces of reference sensing data included in the N number of pieces of sensing data obtained from the N number of second electrodes and the one or more pieces of temporary reference data selected in operation (c) when the driving signal is applied to the other first electrodes adjacent to the first electrode to which the driving signal is applied; (e) calculating an N number of difference values between the N number of pieces of sensing data obtained in operation (b) and an N number of pieces of sensing data including the reference sensing data based on the difference values calculated in operation (d); and (f) determining the temporary reference data having a relatively small representative value, as reference sensing data for the N number of pieces of sensing data obtained in operation (b), by calculating a representative value of the N number of difference values with respect to respective pieces of temporary reference data among the one or more pieces of temporary reference data.

The operations (a) through (f) may be performed for respective electrodes among the M number of first electrodes.

The operation (a) may include: sequentially applying the driving signals to the first upper electrodes in the second axial direction.

The operation (d) may include: calculating difference values between pieces of reference sensing data determined for the first electrode in the lowermost side of the second axial direction and the one or more pieces of temporary reference data selected in operation (c) when the driving signal is applied to the first electrode of the uppermost side of the second axial direction.

The method may further include: (g) generating an N number of effective pieces of sensing data from the N number of pieces of sensing data obtained in operation (b) by using the reference sensing data determined in operation (f).

The method may further include: (h) determining one or more touch inputs based on the N number of effective pieces of sensing data.

According to another aspect of the present invention, there is provided a touch sensing apparatus including: a panel unit including an M×N (M and N being positive integers) number of nodes defined as crossing points of an M number of first electrodes and an N number of second electrodes; a sensing circuit unit detecting an M×N number of changes in capacitance generated from the M×N number of nodes; and an arithmetic operation unit generating an M×N number of pieces of sensing data from the M×N number of changes in capacitance, and determining one or more reference sensing data for generating an M×N number of effective pieces of sensing data from the M×N number of pieces of sensing data, wherein the arithmetic operation unit selects one or more pieces of temporary reference data from an N number of first sensing data obtained from the N number of second electrodes crossing one of the M number of first electrodes, compares the one or more pieces of temporary reference data with reference sensing data for an N number of second sensing data obtained from the N number of second electrodes crossing the adjacent other first electrodes, and determines reference sensing data for the N number of first sensing data.

The arithmetic operation unit may process the N number of first sensing data so that the one or more pieces of temporary reference data has the same value as the reference sensing data for the N number of second sensing data, calculate an N number of difference values between the processed N number of first sensing data and the N number of second sensing data, and determine the temporary reference data having a relatively smaller representative value of the N number of difference values as the reference sensing data for the N number of first sensing data.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
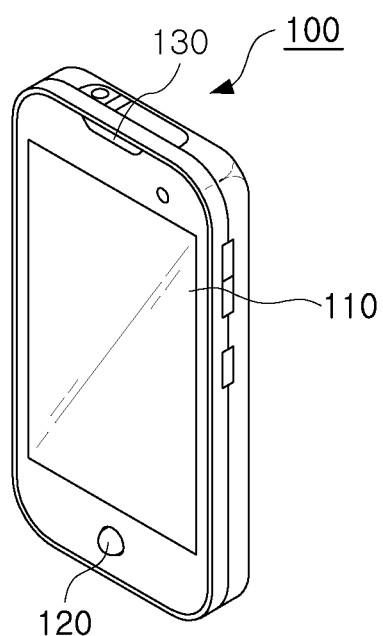
FIG. 1 is a perspective view of the exterior of an electronic device including a touch sensing apparatus according to an embodiment of the present invention.

Embodiments of the present invention will be described in detail with reference to the accompanying drawings. These embodiments will be described in detail to allow those skilled in the art to practice the present invention. It should be appreciated that various embodiments of the present invention are different but are not necessarily exclusive. For example, specific shapes, configurations, and characteristics described in an embodiment of the present invention may be implemented in another embodiment without departing from the spirit and the scope of the present invention. In addition, it should be understood that positions and arrangements of individual components in each disclosed embodiment may be changed without departing from the spirit and the scope of the present invention. Therefore, the detailed description described below should not be construed as having a restrictive meaning. The scope of the present invention is limited only by the accompanying claims and their equivalents, if they are appropriately described. The similar reference numerals will be used to describe the same or similar function throughout the accompanying drawing.

Hereinafter, embodiments of the present invention will be described in detail with reference to the accompanying drawings so that those skilled in the art may easily practice the present invention.

FIG. 1 is a perspective view of the exterior of an electronic device 100 including a touch sensing apparatus according to an embodiment of the present invention.

Referring to FIG. 1, the electronic device 100 of the present embodiment may include a display apparatus 110 for outputting a screen, a mechanical button 120, and an audio unit 130 for outputting audio information, and may provide the touch sensing apparatus integrally formed with the display apparatus 110.

As shown in FIG. 1, in a mobile device, in general, the touch sensing apparatus is integrally formed with the display apparatus 110. The touch sensing apparatus needs to have a high level of light transmittance in such a way that the screen displayed by the display apparatus 110 may be transmitted. Thus, the touch sensing apparatus may be implemented by forming a sensing electrode formed of a transparent, electrically conductive material such as indium-tin oxide (ITO), indium zinc oxide (IZO), zinc oxide (ZnO), carbon nano tubes (CNTs), or graphene in a base substrate formed of a transparent film material such as polyethylene terephthalate (PET), polycarbonate (PC), polyethersulfone (PES), polyimide (PI), and the like. A wire pattern connected to the sensing electrode formed of the transparent conductive material is disposed in a bezel region of the display apparatus 110, and is visually shielded by the bezel region, and thus the wire pattern may be formed of a metal such as silver (Ag), copper (Cu), etc.

Although the mechanical button 120 is assumed to be a mouse device disposed in the bottom of the display apparatus 110 and a mechanical button disposed in a housing side of the electronic device 100 in FIG. 1, the present invention is not necessarily limited thereto. That is, the number of mechanical buttons may be increased or decreased, compared to the embodiment of FIG. 1, and locations of mechanical buttons may also be modified in various ways.

Figure 2:
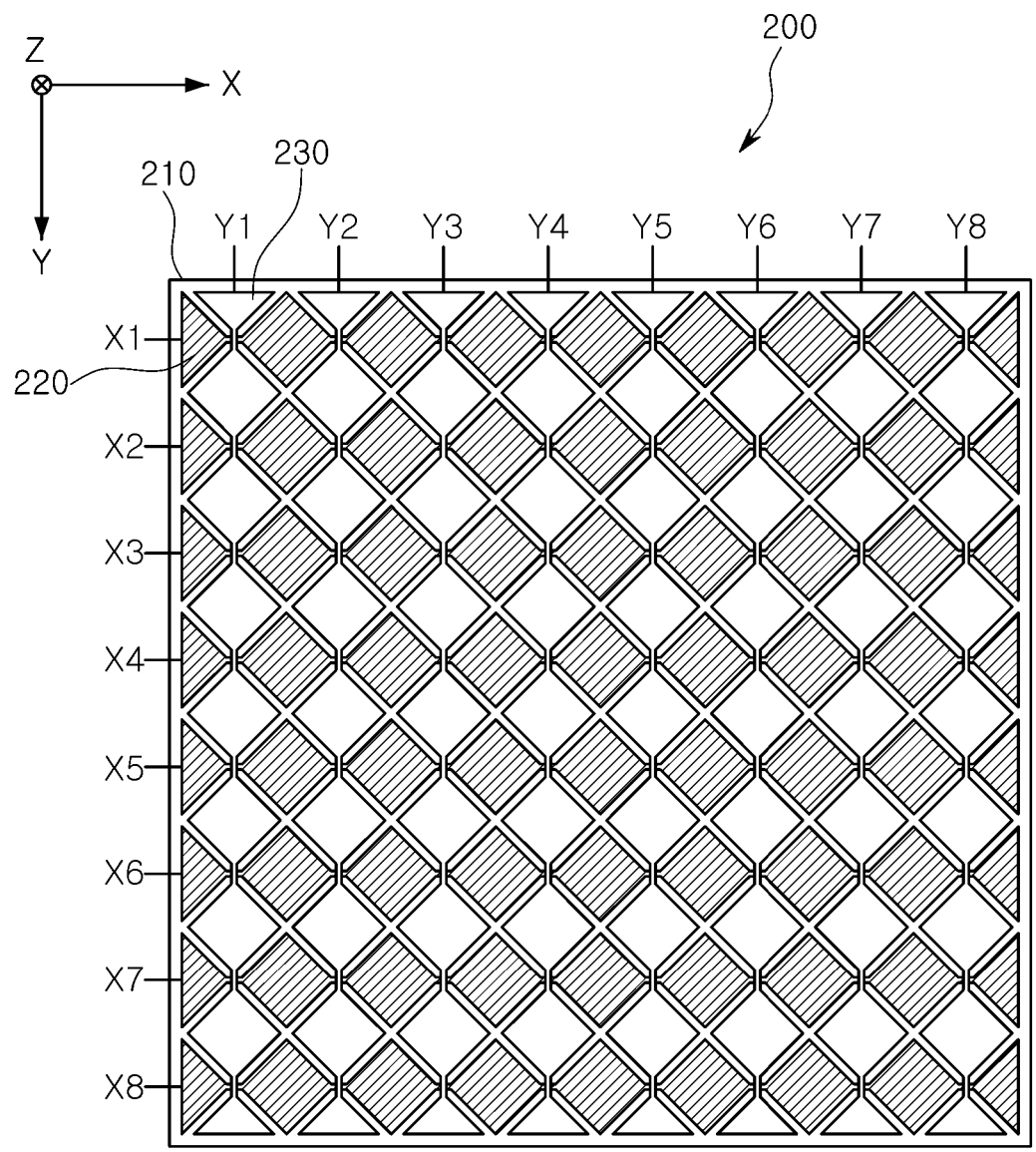
FIG. 2 is a plan view of a panel unit of a touch sensing apparatus according to an embodiment of the present invention.

FIG. 2 is a plan view of a panel unit of a touch sensing apparatus according to an embodiment of the present invention.

Referring to FIG. 2, a touch screen 200 of the present embodiment includes a substrate 210 and a plurality of sensing electrodes 220 and 230 disposed on the substrate 210. Although not shown in FIG. 2, the plurality of sensing electrodes 220 and 230 may be electrically connected to a wire pattern of a circuit substrate attached to one end of the substrate 210 through a wire and a bonding pad, respectively. A controller integrated circuit (IC) may be mounted in the circuit substrate to detect sensing signals generated by the plurality of sensing electrodes 220 and 230, and determine a touch input from the sensing signals.

In a touch screen apparatus, the substrate 210 may be a transparent substrate in which the sensing electrodes 220 and 230 are to be formed, and may be formed of a plastic material such as polyimide (PI), polymethylmethacrylate (PMMA), polyethyleneterephthalate (PET), and polycarbonate (PC) or tempered glass. Also, in addition to a region of the substrate 210 in which the sensing electrodes 220 and 230 are formed, with respect to a region of the substrate 210 including the wire connected to the sensing electrodes 220 and 230, a predetermined printing region for visually shielding the wire usually formed of an opaque metallic material may be formed in the substrate 210.

The plurality of sensing electrodes 220 and 230 may be disposed at one side of the substrate 210 or on both sides thereof, and may be formed of ITO, IZO, ZnO, CNT, a graphene-based material, or the like, having transparent conductivity in the touch screen apparatus. Although the sensing electrodes 220 and 230 having lozenge or diamond shaped patterns are shown in FIG. 2, the electrodes 220 and 230 may have patterns having various polygonal shapes such as a rectangular shape, a triangular shape, or the like.

The plurality of sensing electrodes 220 and 230 may include first electrodes 220 extending in an X-axial direction and second electrodes 230 extending in a Y-axial direction. The first electrodes 220 and the second electrodes 230 may be disposed at both sides of the substrate 210 or in different substrates 210 to intersect with each other. In a case in which the first electrodes 220 and the second electrodes 230 are entirely disposed on one side of the substrate 210, predetermined insulation layers may be partially formed in crossing points of the first electrodes 220 and the second electrodes 230.

An apparatus that is electrically connected to the plurality of sensing electrodes 220 and 230 and senses a touch input detects a change in capacitance generated in the plurality of sensing electrodes 220 and 230 according to the touch input and senses the touch input from the change in capacitance. The first electrodes 220 may be connected to channels defined as D1-D8 in the controller IC and receive predetermined driving signals. The second electrodes 230 may be connected to channels defined as S1~S8 so as to be used by the touch sensing apparatus to detect a sensing signal. In this regard, the controller IC may operate by detecting a change in mutual-capacitance generated between the first electrode 220 and the second electrodes 230 as the sensing signal, sequentially applying the driving signals to the first electrodes 220, and simultaneously detecting a change in capacitance from the second electrodes 230.

Figure 3:
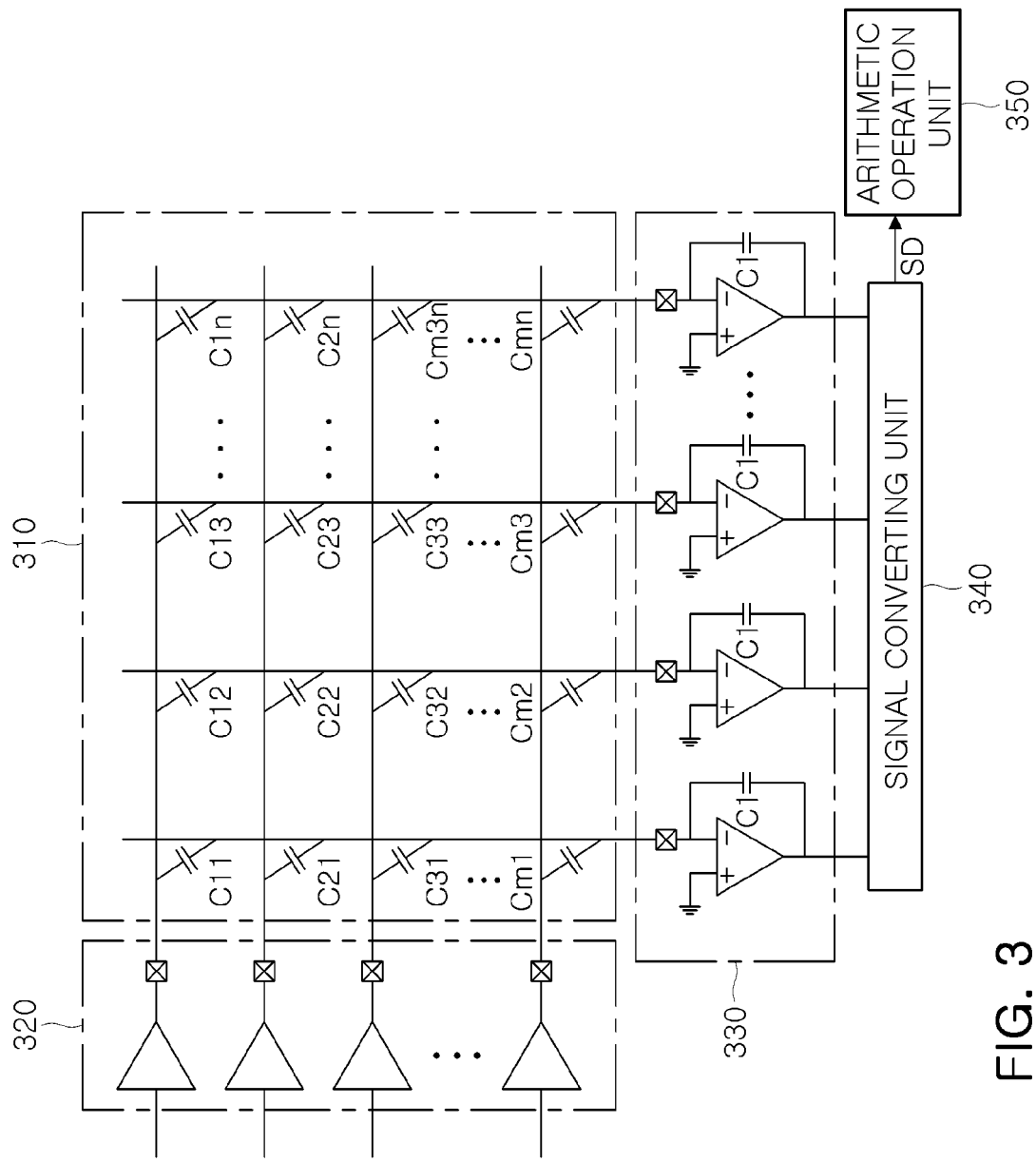
FIG. 3 is a circuit diagram of a touch sensing apparatus according to an embodiment of the present invention.

FIG. 3 is a circuit diagram of a touch sensing apparatus according to an embodiment of the present invention.

Referring to FIG. 3, the touch sensing apparatus according to the present embodiment includes a panel unit 310, a driving circuit unit 320, a sensing circuit unit 330, a signal converting unit 340, and an arithmetic operation unit 350. The panel unit 310 includes an M number of first electrodes extending in a first axial direction—a horizontal direction of FIG. 3—and an N number of second electrodes extending in a second axial direction across the first axial direction—a vertical direction of FIG. 3. Changes in capacitance C11-Cmn occur in a plurality of nodes in which the first electrodes and the second electrodes intersect with each other. The changes in capacitance C11-Cmn occuring in the plurality of nodes may be changes in mutual-capacitance generated by driving signals applied to the first electrodes by the driving circuit unit 320. Meanwhile, the driving circuit unit 320, the sensing circuit unit 330, the signal converting unit 340, and the arithmetic operation unit 350 may be implemented as a single IC.

The driving circuit unit 320 applies predetermined driving signals to first electrodes of the panel unit 310. The driving signals may be square wave signals, sine wave signals, and triangle wave signals having predetermined periods and amplitudes, and may be sequentially applied to respective first electrodes among the plurality thereof. Although circuits for generating and applying the driving signals are respectively connected to the plurality of first electrodes in FIG. 3, one driving signal generation circuit may also be provided to apply the driving signals to the plurality of first electrodes by using a switching circuit. Also, in a case in which various functions are implemented by combining an input through a mechanical button and a touch input like the present embodiment, the driving signals may be applied to all the first electrodes or may be selectively applied to only some of the first electrodes to simply sense whether the touch input exists or not.

The sensing circuit unit 330 may include an integral circuit to sense the changes in capacitance C11-Cmn occuring in the plurality of nodes. The integral circuit may be connected to a plurality of second electrodes. The integral circuit may include at least one arithmetic operation amplifier and a capacitor C1 having a predetermined capacity. An inversion input terminal of the arithmetic operation amplifier is connected to the second electrodes to convert the changes in capacitance C11-Cmn into an analog signal such as a voltage signal and output the converted signal. In a case in which the driving signals are sequentially applied to the plurality of first electrodes, since the changes in capacitance C11-Cmn may be simultaneously detected from the plurality of second electrodes, the integral circuit may be included in the sensing circuit unit 330 by an N number of the second electrodes.

The signal converting unit 340 generates a digital signal SD from the analog signal generated by the integral circuit. For example, the signal converting unit 340 may include a time-to-digital converter (TDC) circuit that measures time taken for the analog signal output by the sensing circuit unit 330 to reach a predetermined reference voltage level in a voltage form and converts the analog signal into the digital signal SD, or an analog-to-digital converter (ADC) circuit that measures a level of the analog signal output by the sensing circuit unit 330, which changes during a predetermined period of time, and converts the analog signal into the digital signal SD. The arithmetic operation unit 350 determines a touch input applied to the panel unit 310 by using the digital signal SD. As an embodiment, the arithmetic operation unit 350 may determine the number of touch inputs applied to the panel unit 310, coordinates thereof, gesture actions thereof, and the like.

The digital signal SD that is a basis for determining the touch input in the arithmetic operation unit 350 may be data that expresses the changes in capacitance C11-Cmn numerically, and, in particular, may be data indicating capacitance differences between cases in which the touch input does not occur and the touch input occurs. Thus, as long as the changes in capacitance C11-Cmn do not occur over all nodes in the front of the panel unit 310, it is necessary to select data generated from capacitance of a node in which the touch input does not occur, as reference data. In this regard, when an error occurs in selecting the reference data, the error may increase or decrease the data, and may have an adverse affect in determining the touch input.

Hereinafter, a data processing method of a touch sensing apparatus according to an embodiment of the present invention will be described with reference to FIGS. 4 and 5.

Figure 4:
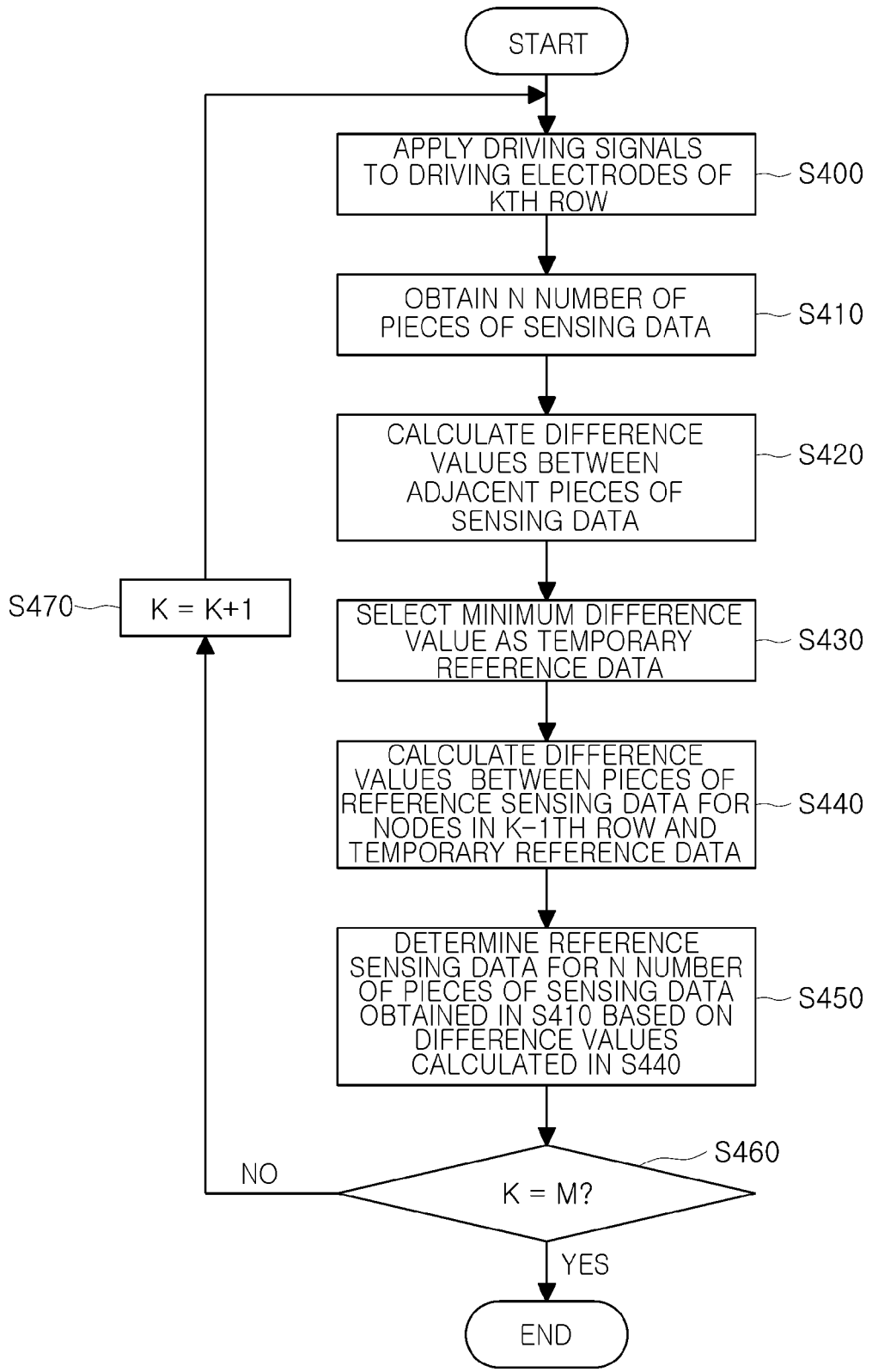
FIGS. 4 and 5 are flowcharts of a data processing method of a touch sensing apparatus according to an embodiment of the present invention.
Figure 5:
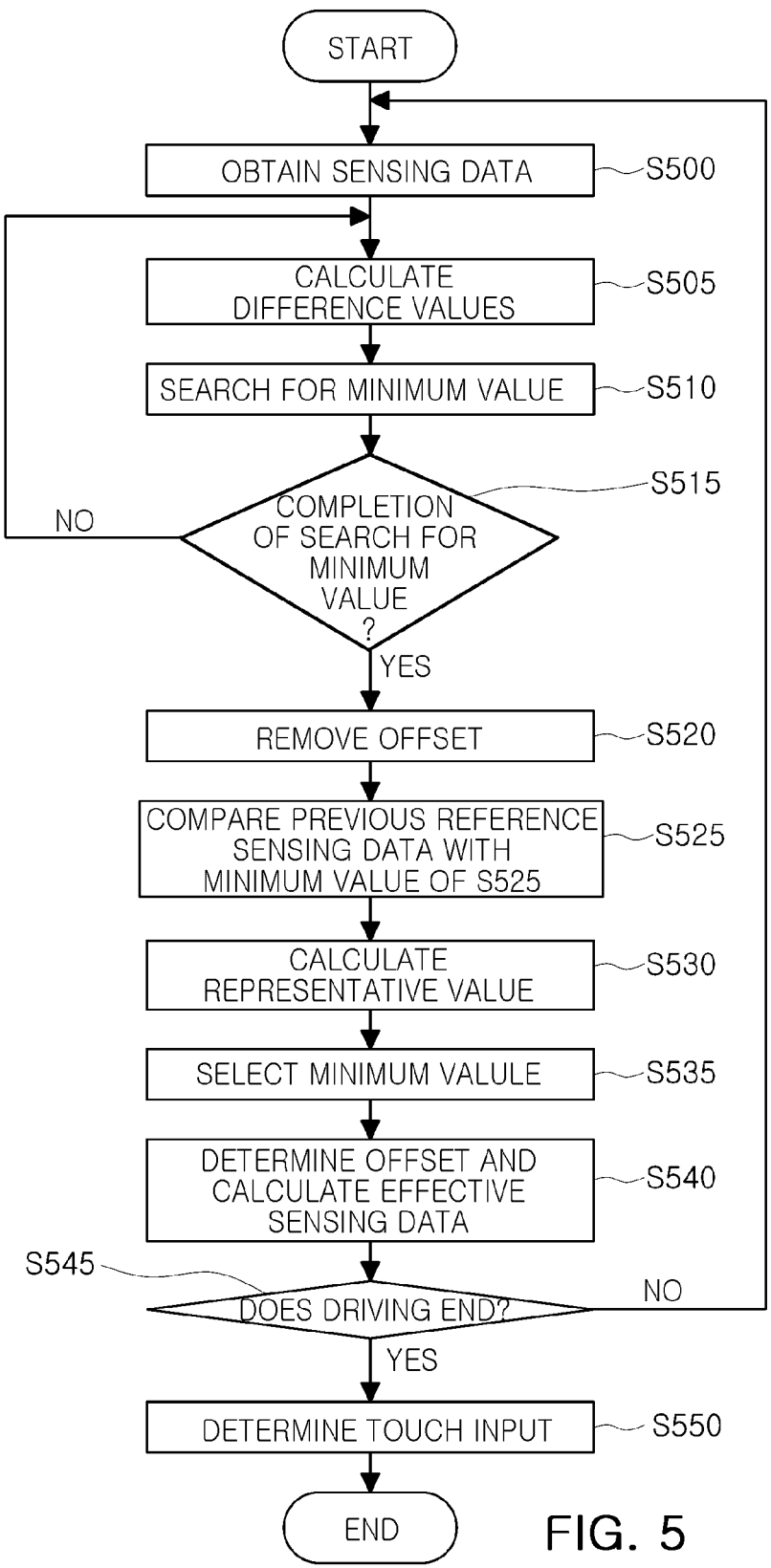

FIGS. 4 and 5 are flowcharts of a data processing method of a touch sensing apparatus according to embodiments of the present invention.

Referring to FIG. 4, the data processing method according to the present embodiment starts applying driving signals to first electrodes of a Kth row and obtaining an N number of pieces of sensing data (S400 and S410). In general, the first electrodes extending in a horizontal axial direction sequentially receive the driving signals in a specific direction in the panel unit 310 of FIG. 3. That is, the driving signals are applied to the first electrodes disposed in the uppermost of the panel unit 310, changes in capacitance C11~C1N are detected therefrom, and the N number of pieces of sensing data may be obtained. Next, the driving signals are applied to the first electrodes disposed in the upper second row of the panel unit 310, changes in capacitance C21~C2N are detected, and the N number of pieces of sensing data may be obtained. Such operations of sequentially applying the driving signals and detecting the changes in capacitance may result in obtaining an M×N number of pieces of sensing data each corresponding to the changes in capacitance C11-Cmn.

When the N number of pieces of sensing data is obtained for respective rows among an M number of rows, the arithmetic operation unit 350 calculates difference values between adjacent sensing data (S420). For example, in a case in which the driving signals are applied to the first electrodes disposed in the uppermost of the panel unit 310, and the N number of pieces of sensing data corresponding to the changes in capacitance C11~C1N is obtained, an N−1 number of sensing a difference in data values corresponding to differences between C11 and C12, C12 and C13, C13 and C14, and C1(N−1) and C1N may be calculated. That is, the difference values between adjacent sensing data calculated in S420 may be defined as difference values between adjacent sensing data in a row direction in which the first electrodes extend.

When the difference values between sensing data adjacent in the row direction are calculated, the arithmetic operation unit 350 selects the sensing data indicating the least difference value as temporary reference data (S430). Hereinafter, for descriptive convenience, it is assumed that sensing data as shown in Table 1 below is obtained in the panel unit 310 having a matrix structure of 8×8.

TABLE 1

|    | S1 | S2 | S3 | S4 | S5 | S6 | S7 | S8 |
|----|----|----|----|----|----|----|----|----|
| D1 | 10 | 10 | 10 | 11 | 12 | 10 | 10 | 10 |
| D2 | 15 | 15 | 15 | 25 | 25 | 15 | 15 | 15 |
| D3 | 15 | 15 | 23 | 35 | 35 | 23 | 15 | 15 |
| D4 | 15 | 15 | 15 | 23 | 23 | 15 | 15 | 15 |
| D5 | 20 | 20 | 20 | 20 | 20 | 20 | 20 | 20 |
| D6 | 15 | 15 | 15 | 15 | 15 | 15 | 15 | 15 |
| D7 | 5  | 5  | 6  | 5  | 5  | 6  | 5  | 5  |
| D8 | 10 | 9  | 8  | 9  | 10 | 11 | 10 | 10 |

Table 1 above shows that no change in capacitance is generated from second electrodes connected to first electrodes D1 and D5~D8. As described above, since the change in capacitance necessary for determining a touch input is not an absolute value but is a difference value between cases where the touch input occurs and does not occur, the touch input may not influence the first electrodes D1 and D5~D8 in which there is little change in the sensing data in a single row. A result obtained by performing an operation of calculating the difference values between adjacent sensing data in S420 is shown in Table 2 below based on Table 1. Data of Table 2 is expressed as all absolute values.

TABLE 2

| | Difference values | | | | | | |
|---|---|---|---|---|---|---|---|
| | S1-S2 | S2-S3 | S3-S4 | S4-S5 | S5-S6 | S6-S7 | S7-S8 |
| INDEX | 1 | 2 | 3 | 4 | 5 | 6 | 7 |
| D1 | 0 | 0 | 1 | 1 | 2 | 0 | 0 |
| D2 | 0 | 0 | 10 | 0 | 10 | 0 | 0 |
| D3 | 0 | 8 | 12 | 0 | 12 | 8 | 0 |
| D4 | 0 | 0 | 8 | 0 | 8 | 0 | 0 |
| D5 | 0 | 0 | 0 | 0 | 0 | 0 | 0 |
| D6 | 0 | 0 | 0 | 0 | 0 | 0 | 0 |
| D7 | 0 | 1 | 1 | 0 | 1 | 1 | 0 |
| D8 | 1 | 1 | 1 | 1 | 1 | 1 | 0 |

As shown in Table 2 above, since a difference between 8 pieces of sensing data obtained for one row and a further piece of sensing data adjacent in the row direction is calculated, the total of 7 sensing differences in data values for one row may be obtained. When this is expressed as an index, the total of 7 indices may be obtained. An index having the minimum sensing data difference value for each row is selected, and the sensing data is selected as the temporary reference data (S430).

In the first electrode D1, the sensing difference in data values is 0 in indices 1, 2, 6, and 7. Thus, one of sensing data obtained through second electrodes S1, S2, S3, S6, S7, and S8 may be selected as the temporary reference data, and has a value of 10. In the first electrode D3, since the sensing difference in data values is 0 as the minimum value in indices 1, 4, and 7, the sensing data obtained through the second electrodes S1, S2, S4, S5, S7, and S8 may be selected as the temporary reference data. Therefore, unlike the first electrode D1, the temporary reference data may have two values of 15 and 35 in the first electrode D3.

When the temporary reference data is selected, the arithmetic operation unit 350 calculates a difference value between reference sensing data for a node of a K-1th row and the temporary reference data of the Kth row calculated in S430 (S440). With respect to Table 1, reference sensing data of the 8 pieces of sensing data obtained by applying the driving signals to the first electrodes D2 corresponding to the 2nd row is 15. This results from the minimum value of 15 among the 8 pieces of sensing data corresponding to the first electrodes D2 for descriptive convenience. Reference sensing data that is continuously renewed through the data processing method described in the present embodiment may be actually utilized.

As described with reference to Table 2 above, temporary reference data of the 8 pieces of sensing data obtained by applying the driving signals to the first electrodes D3 corresponding to the 3rd row is 15 or 35. Thus, the difference value calculated in S440 may also have two values of 0 and 20. The arithmetic operation unit 350 may determine reference sensing data with respect to the N number of pieces of sensing data obtained in S410, based on the difference value calculated in S440 (S450).

The N number of pieces of sensing data obtained in S410 is sensing data obtained by applying the driving signals to the first electrodes in the Kth row. When it is assumed that the first electrodes in the Kth row that receive the driving signals in S400 are the first electrodes D3 of Tables 1 and 2, the arithmetic operation unit 350 may calculate difference values between the 8 pieces of sensing data corresponding to the first electrodes D3 and the 8 pieces of sensing data corresponding to the first electrodes D2 and determine the reference sensing data with respect to the first electrodes D3.

However, the difference values between the 8 pieces of sensing data corresponding to the first electrodes D3 and the 8 pieces of sensing data corresponding to the first electrodes D2 may be calculated by not using a method of simply reducing adjacent sensing data but by using a method of allowing the temporary reference data of the first electrodes D3 and the reference sensing data of the first electrodes D2 to be consistent with each other and reducing the adjacent sensing data.

In more detail, since the temporary reference data of the first electrodes D3 is 15 or 35, 15 is first selected as the temporary reference data of the first electrodes D3. Since the reference sensing data of the first electrodes D2 is 15, in this case, it is not necessary to further correct the 8 pieces of sensing data corresponding to the first electrodes D3. Thus, the difference values may be calculated as shown in Table 3 below.

TABLE 3

| | S1 | S2 | S3 | S4 | S5 | S6 | S7 | S8 |
|---|---|---|---|---|---|---|---|---|
| Difference values | 0 | 0 | 8 | 10 | 10 | 8 | 0 | 0 |

Meanwhile, when 35 is first selected as the temporary reference data of the first electrodes D3, since the reference sensing data of the first electrodes D2 is 15, a difference value of 20 takes place. Thus, to allow the temporary reference data of the first electrodes D3 to be consistent with the reference sensing data of the first electrodes D2, the difference value of 20 is reduced from the 8 pieces of sensing data corresponding to the first electrodes D3 and the 8 pieces of sensing data are corrected. Therefore, the corrected 8 pieces of sensing data, and the difference values between the corrected 8 pieces of sensing data and the 8 pieces of sensing data corresponding to the first electrodes D2 are shown as Table 4 below.

TABLE 4

| | S1 | S2 | S3 | S4 | S5 | S6 | S7 | S8 |
|---|---|---|---|---|---|---|---|---|
| Corrected Data | −5 | −5 | 3 | 15 | 15 | 3 | −5 | −5 |
| Difference values | 20 | 20 | 12 | 10 | 10 | 12 | 20 | 20 |

A sum of the difference values of Table 3 is 36, and a sum of the difference values of Table 4 is 124. The arithmetic operation unit 350 may determine temporary reference data in a case in which the sum of the difference values is small, as the reference sensing data with respect to the 8 pieces of sensing data of the first electrodes D3. That is, a reference sensing data value with respect to the 8 pieces of sensing data of the first electrodes D3 may be determined as 15 in the present embodiment.

After S400 through S450 are performed, the arithmetic operation unit 350 determines whether K is identical to the total number of M of the first electrodes (S460). When K is identical to M, the arithmetic operation unit 350 determines that a one-time scanning operation is completely performed on the whole of the panel unit 310 and ends the operation. When K is not identical to M, the arithmetic operation unit 350 increases K by 1 and determines reference sensing data for a next row.

Next, the data processing method according to the present embodiment will be described in more detail with reference to FIG. 5. Referring to FIG. 5, the data processing method according to the present embodiment starts obtaining sensing data (S500). As shown in FIG. 3, the arithmetic operation unit 350 may obtain the M×N number of pieces of sensing data corresponding to the changes in capacitance C11-Cmn generated by the M×N number of nodes, from the signal conversing unit 340. The arithmetic operation unit 350 may classify and process the obtained M×N number of pieces of sensing data for each row.

The arithmetic operation unit 350 applies driving signals to first electrodes of a specific row and calculates difference values by using the obtained M×N number of pieces of sensing data (S505). The difference values calculated in S505 may be difference values between sensing data adjacent in a row direction. When it is assumed that the driving signals are applied to the first electrodes in the Kth row and the total number of 16 pieces of sensing data is obtained, the arithmetic operation unit 350 may calculate the difference values between pieces of sensing data adjacent in the row direction and obtain the total number of 15 difference values in S505. The arithmetic operation unit 350 searches for the minimum value among the 15 difference values (S510).

When the minimum value is completely searched (S515), the minimum value may be applied to remove an offset of 16 pieces of sensing data with respect to the Kth row (S520). This may be regarded as corresponding to a process of removing a first offset component and noise with respect to the 16 pieces of sensing data in the Kth row. When the offset is removed, the arithmetic operation unit 350 compares reference sensing data of a previous row with the minimum value calculated in S515 (S525).

The "previous row" in S525 is a row in which the same arithmetic operation is performed before a series of arithmetic operations are performed with respect to the Kth row, and may be a row according to a reverse direction sequence of a sequence for applying the driving signals. That is, in a case in which the driving signals are sequentially applied to the first electrodes from a first row to an Mth row, the "previous row" in S525 may be defined as a K-1th row corresponding to a row prior to the Kth row in which an arithmetic operation for calculating the reference sensing data is currently performed.

In a case in which the reference sensing data is previously determined in the K-1th row, the arithmetic operation unit 350 corrects respective pieces of data among the 16 pieces of sensing data corresponding to the Kth row with respect to the reference sensing data of the K-1th row. Thereafter, the arithmetic operation unit 350 calculates 16 difference values between the corrected 16 pieces of sensing data of the Kth row and the 16 pieces of sensing data of the K-1th row and calculates a representative value of the 16 difference values (S530).

In this regard, a minimum difference value between the 16 pieces of sensing data corresponding to the Kth row searched in S510 may not be necessarily selected as one. Thus, when at least two minimum difference values are selected as described with reference to FIG. 4, the representative value calculated in S530 may be also two or more representative values. Thus, the arithmetic operation unit 350 selects the representative value having the minimum value from among the representative values calculated in S530 (S535), determines the selected representative value as a final offset value of the K-th row, and calculate effective sensing data (S540).

The offset value determined in S540 has the same meaning as the reference sensing data as described with reference to FIG. 4, and thus the final effective sensing data may be calculated by removing the offset value from the 16 pieces of sensing data corresponding to the Kth row. The arithmetic operation unit 350 determines whether driving is completed by applying the driving signals to all the first electrodes (S545), and, when the driving is completed, determines a touch input by using the effective sensing data calculated in S540.

FIGS. 6A through 7C are diagrams for explaining a data processing method of a touch sensing apparatus according to an embodiment of the present invention.

Figure 6A:
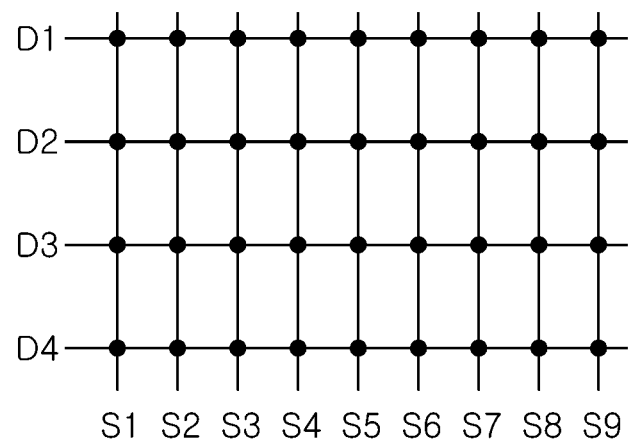
FIGS. 6A through 7C are diagrams for explaining a data processing method of a touch sensing apparatus according to an embodiment of the present invention.
Figure 6B:
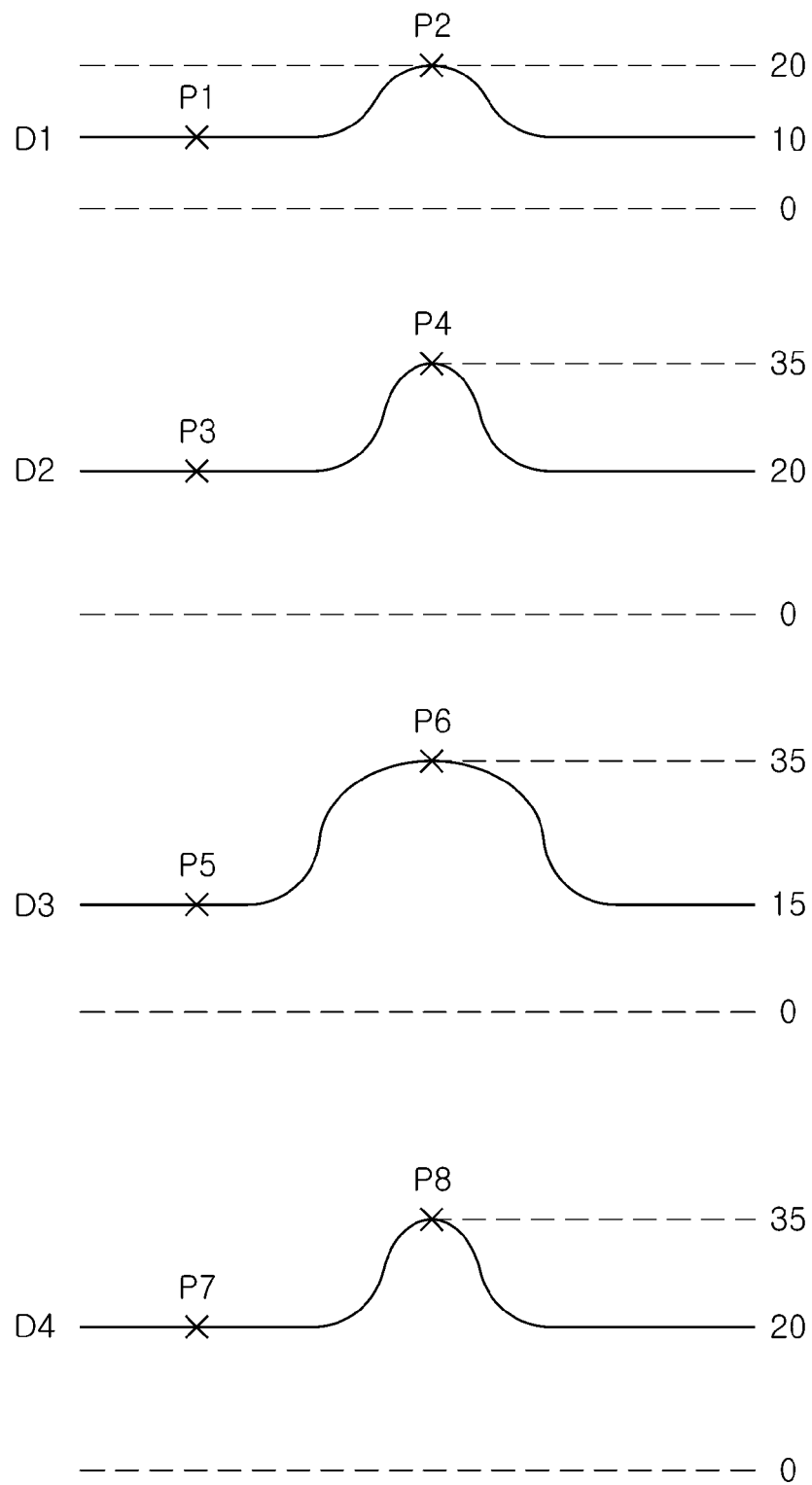

Referring to FIG. 6A, a 4×9 panel unit is illustrated. Driving signals are sequentially applied to first electrodes D1 through D4. A change in capacitance is sensed through second electrodes S1 through S9 so that 9 pieces of sensing data are generated for one row. FIG. 6B illustrates graphs showing values of the 9 pieces of sensing data obtained by applying the driving signals to each row. P1 through P8 of the graphs indicate points of the minimum value differences between adjacent pieces of sensing data.

Referring to FIG. 6B, in a case in which the driving signal is applied to the first electrode D1, P1 and P2 indicate the points of the minimum values differences between adjacent pieces of sensing data. Similarly to the case of the first electrode D1, in the case of the first electrodes D2 through D4, the graphs show points of the minimum difference values between adjacent pieces of sensing data in a portion having a weak change in the values of the sensing data and around the maximum point of a region in which the sensing data increases by a touch input.

Hereinafter, on the assumption that sensing data of the point P3 is set as reference sensing data in the case of the first electrode D2, a method of setting reference sensing data of the first electrode D3 will be described.

Figure 6C:
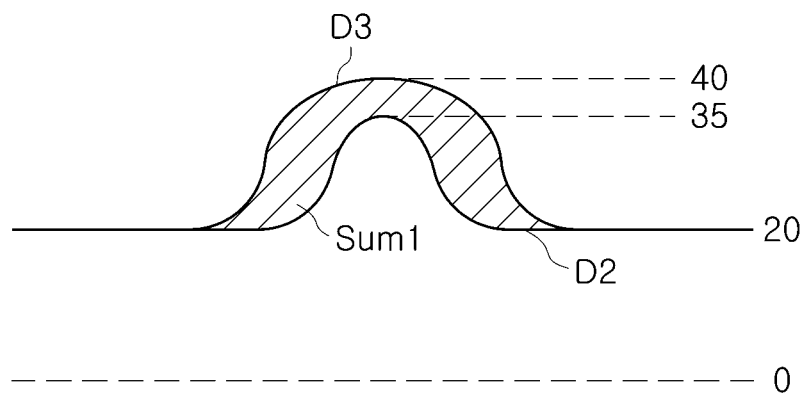

After applying the driving signals to the first electrode D3 and generating the 9 pieces of sensing data, P5 and P6 are points of the minimum difference values between adjacent sensing data. Thus, the arithmetic operation unit 350 first allows P5 and P3 to be consistent with each other and calculates difference values—hereinafter, referred to as first difference values—between 9 pieces of sensing data for the first electrode D2 and 9 pieces of sensing data for the first electrode D3. This is illustrated in FIG. 6C. A part indicating Sum1 in FIG. 6C is a representative value of the first difference values.

Meanwhile, the arithmetic operation unit 350 allows P6 and P3 indicating the minimum difference values between adjacent sensing data to be consistent with each other and calculates difference values—hereinafter, referred to as second difference values—between the 9 pieces of sensing data for the first electrode D2 and the 9 pieces of sensing data for the first electrode D3. A representative value of the second difference values are shown as Sum2 in FIG. 6D.

Figure 6D:
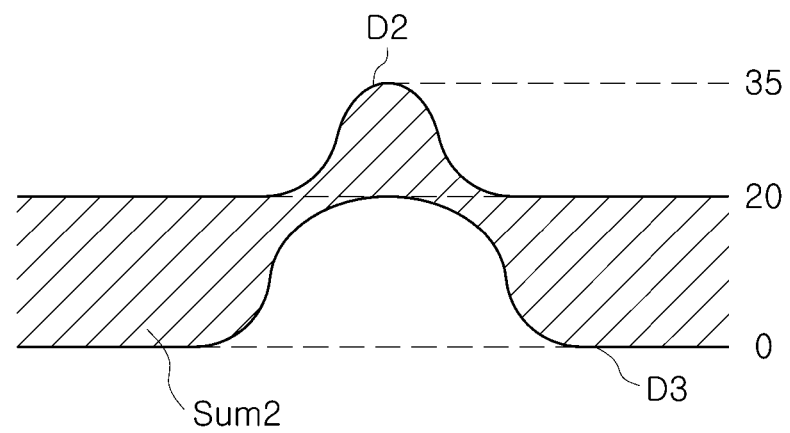

Referring to FIGS. 6C and 6D, the representative value of the first difference values is smaller than the representative value of the second difference values. The representative values for comparing the first difference values with the second difference values may be the sum of absolute values or a root mean square (RMS) value, or the like. The arithmetic operation unit 350 selects the case of the first difference values having the smaller representative value and selects the point P5 having the minimum value of the first electrodes D3 as the reference sensing data of the 9 pieces of sensing data of the first electrode D3.

Figure 7A:
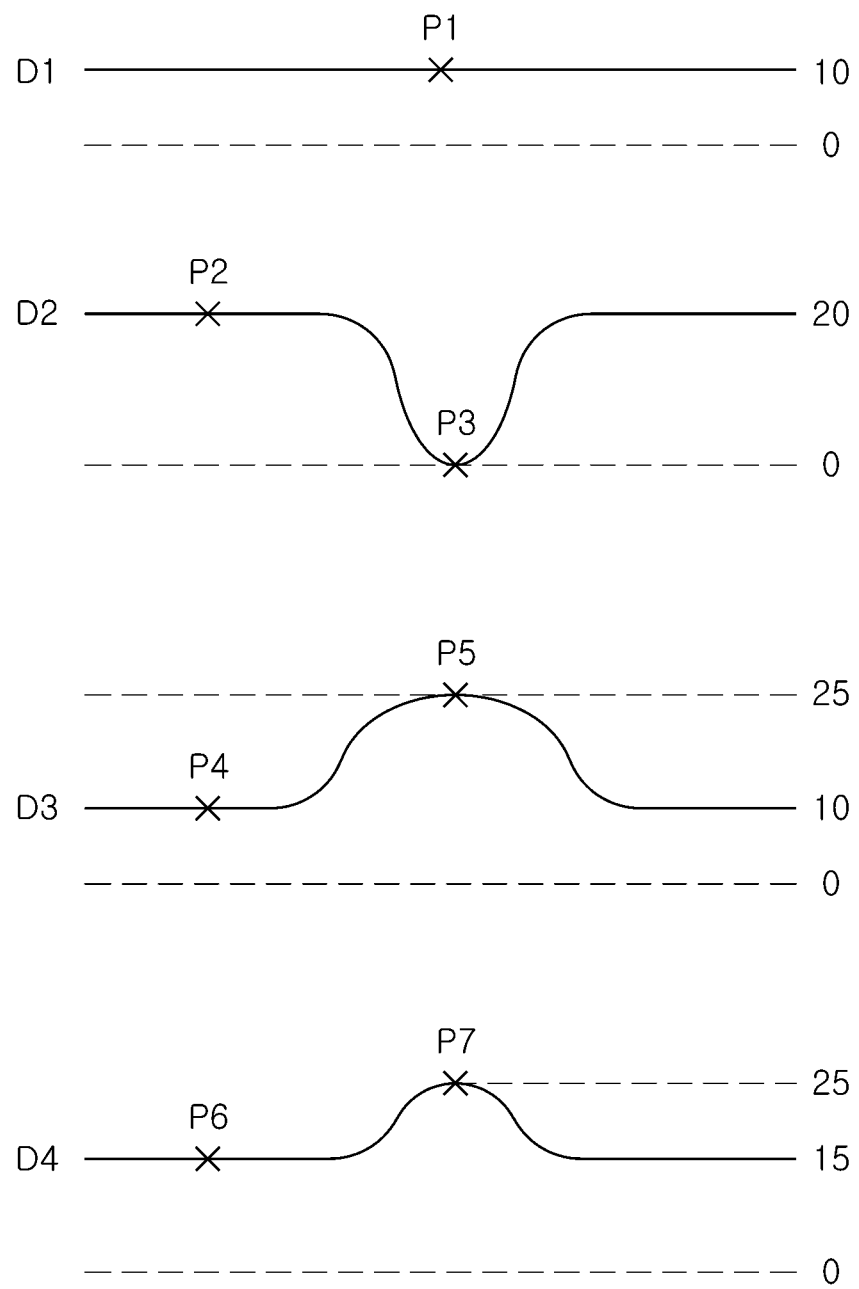

Referring to FIG. 7A, similarly to FIG. 6B, a graph of the 9 pieces of sensing data obtained by applying the driving signals to the first electrodes D1 through D4 is shown. The case of the first electrode D1 in which no touch input takes place has little value difference of the sensing data. Also, the case of the first electrode D2 in which water droplets exist has a point having the sensing data lower than the point in which no touch input takes place. Also, the points P2 and P3 also simultaneously indicate the minimum value differences between adjacent sensing data.

A process of setting reference sensing data of the 9 pieces of sensing data for the first electrode D2 will be described. When it is assumed that the 9 pieces of sensing data for the first electrode D1 have the same value, the points P2 and P3 having the minimum difference value between adjacent pieces of sensing data are selected as temporary reference data from among the 9 pieces of sensing data for the first electrode D2. The arithmetic operation unit 350 allows P2 and P1 to be consistent with each other to calculate difference values—hereinafter, referred to as first difference values— between the 9 pieces of sensing data, and allows P3 and P1 to be consistent with each other to calculate difference values— hereinafter, referred to as second difference values—between the 9 pieces of sensing data.

When the arithmetic operation unit 350 performs an arithmetic operation on representative values of the calculated first difference values and second difference values, the first difference values are smaller than the second difference values. Thus, P2, other than P3, is selected as the reference sensing data in the 9 pieces of sensing data for the first electrodes D2. Therefore, even in a case in which sensing data is lower than the point in which no touch input takes place due to water droplets existing on the panel unit 310, the reference sensing data may be precisely calculated.

Figure 7B:
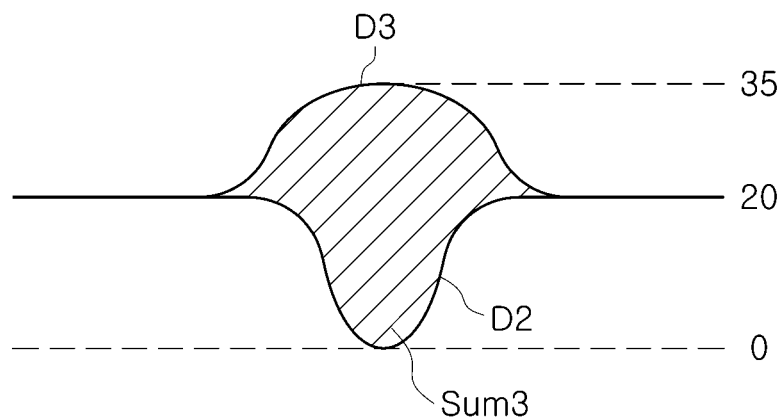

When P2 is selected as the reference sensing data for the first electrode D2, reference sensing data for the first electrode D3 may be accordingly determined. As shown in FIG. 7B, the point P4 having the minimum difference value between adjacent sensing data from the 9 pieces of sensing data for the first electrode D3 is selected as a temporary piece of reference data to correct the point P4 to be consistent with the point P2. Difference values between the 9 pieces of sensing data for the first electrodes D3 and the 9 pieces of sensing data for the first electrode D2 are calculated, and Sum3 may be calculated as a representative value of the difference values.

Figure 7C:
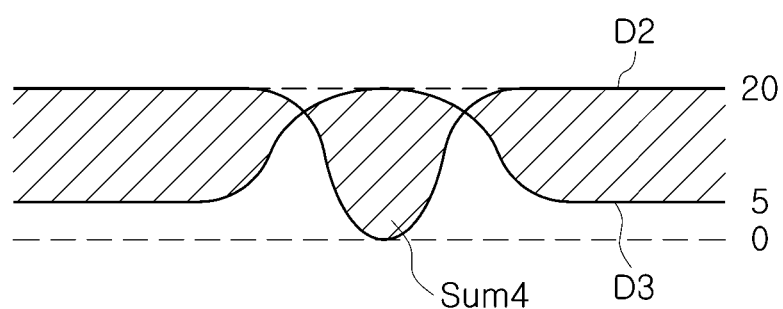

Meanwhile, when the point P5 having the minimum difference value between adjacent sensing data among the 9 pieces of sensing data for the first electrode D3 is selected as temporary reference data to correct the point P5 to be consistent with the point P2, Sum4 may be calculated as a representative value of difference values between the 9 pieces of sensing data for the first electrodes D3 and the 9 pieces of sensing data for the first electrode D2. As shown in FIGS. 7B and 7C, since Sum3 is smaller than Sum4, the arithmetic operation unit 350 may select reference sensing data for the first electrode D3 as P4 and calculate effective sensing data.

As set forth above, according to embodiments of the present invention, reference sensing data is set for respective pieces of N number of sensing data among N number of pieces of sensing data for respective rows among an M number of rows obtained from an M×N number of nodes in a touch screen panel unit. In particular, in setting the reference sensing data of the N number of pieces of sensing data obtained from each row, a difference between the reference sensing data with respect to the N number of pieces of sensing data obtained from adjacent other rows is considered, preventing an error of the reference sensing data due to electrical noise or water droplets or dust on the panel unit and precisely determining a touch input.

While the present invention has been shown and described in connection with the embodiments, it will be apparent to those skilled in the art that modifications and variations may be made without departing from the spirit and scope of the invention as defined by the appended claims.

What is claimed is:

1. A data processing method comprising:
   (a) obtaining a plurality of pieces of sensing data according to one or more touch inputs from an M×N (M and N being positive integers) number of nodes included in a panel unit;
   (b) selecting one or more pieces of temporary reference data having the minimum difference value between adjacent other pieces of sensing data gathered in a row direction from among an N number of pieces of sensing data obtained from the nodes included in a Kth (K being a positive integer greater than 1 and less than or equal to M) row;
   (c) calculating difference values between the one or more pieces of temporary reference data selected from the Kth row and reference sensing data in a K-1th row;
   (d) calculating an N number of difference values between the N number of pieces of sensing data obtained from the nodes included in the Kth row and an N number of pieces of sensing data obtained from nodes included in the K-1th row, based on the difference values calculated in operation (c); and
   (e) determining the temporary reference data having a relatively small representative value, as reference sensing data of the Kth row, by calculating a representative value of the N number of difference values with respect to respective pieces of temporary reference data among the one or more pieces of temporary reference data.

2. The method of claim 1, wherein the operation (a) includes:
   sequentially applying predetermined driving signals to respective rows among an M number of rows;
   detecting a plurality of changes in capacitance from an N number of nodes included in the row to which the driving signals are applied; and
   generating the plurality of pieces of sensing data based on the plurality of changes in capacitance.

3. The method of claim 1, wherein the operation (c) includes calculating difference values between the one or more pieces of temporary reference data selected from each row and reference sensing data determined for other rows adjacent in a column direction.

4. The method of claim 1, wherein the operation (e) includes calculating a sum of the N number of difference values or a root mean square (RMS) value, as the representative value for respective pieces of temporary reference data among the one or more pieces of temporary reference data.

5. The method of claim 1, further comprising (f) generating effective sensing data of the Kth row by subtracting the reference sensing data of the Kth row determined in operation (e) from respective pieces of sensing data of the Kth row.

6. The method of claim 5, wherein the operations (b) through (f) are performed for respective rows among the M number of rows.

7. The method of claim 6, further comprising (g) determining the one or more touch inputs by using the effective sensing data for respective rows among the M number of rows.

8. A data processing method comprising:
   (a) applying a driving signal to one of an M number of first electrodes extending in a first axial direction;
   (b) obtaining an N number of pieces of sensing data from an N number of second electrodes extending in a second axial direction so that the N number of second electrodes cross the M number of first electrodes to which the driving signal is applied;
   (c) selecting one or more pieces of temporary reference data having the minimum difference value between adjacent other pieces of sensing data gathered in first axial direction for respective pieces of sensing data among the N number of pieces of sensing data obtained in operation (b);
   (d) calculating difference values between pieces of reference sensing data included in the N number of pieces of sensing data obtained from the N number of second electrodes and the one or more pieces of temporary reference data selected in operation (c) when the driving signal is applied to the other first electrodes adjacent to the first electrode to which the driving signal is applied;
   (e) calculating an N number of difference values between the N number of pieces of sensing data obtained in operation (b) and an N number of pieces of sensing data including the reference sensing data, based on the difference values calculated in operation (d); and (f) determining the temporary reference data having a relatively small representative value, as reference sensing data for the N number of pieces of sensing data obtained in operation (b), by calculating a representative value of the N number of difference values with respect to respective pieces of temporary reference data among the one or more pieces of temporary reference data.

9. The method of claim 8, wherein the operations (a) through (f) are performed for respective electrodes among the M number of first electrodes.

10. The method of claim 9, wherein the operation (a) includes applying the driving signals to the first upper electrodes in the second axial direction sequentially.

11. The method of claim 10, wherein the operation (d) includes calculating difference values between pieces of reference sensing data determined for the first electrode in the lowermost side of the second axial direction and the one or more pieces of temporary reference data selected in operation (c) when the driving signal is applied to the first electrode of the uppermost side of the second axial direction.

12. The method of claim 10, further comprising (h) determining one or more touch inputs based on the N number of effective pieces of sensing data.

13. The method of claim 8, further comprising (g) generating an N number of effective pieces of sensing data from the N number of pieces of sensing data obtained in operation (b) by using the reference sensing data determined in operation (f).

14. A touch sensing apparatus comprising:
a panel unit including an M×N (M and N being positive integers) number of nodes defined as crossing points of an M number of first electrodes and an N number of second electrodes;
a sensing circuit unit detecting an M×N number of changes in capacitance generated from the M×N number of nodes; and
an arithmetic operation unit generating an M×N number of pieces of sensing data from the M×N number of changes in capacitance, and determining one or more reference sensing data for generating an M×N number of effective pieces of sensing data from the M×N number of pieces of sensing data,
the arithmetic operation unit selecting one or more pieces of temporary reference data from an N number of first sensing data obtained from the N number of second electrodes crossing one of the M number of first electrodes, comparing the one or more pieces of temporary reference data with reference sensing data for an N number of second sensing data obtained from the N number of second electrodes crossing the adjacent other first electrodes, and determining reference sensing data for the N number of first sensing data.

15. The apparatus of claim 14, wherein the arithmetic operation unit processes the N number of first sensing data so that the one or more pieces of temporary reference data has the same value as the reference sensing data for the N number of second sensing data, calculates an N number of difference values between the processed N number of first sensing data and the N number of second sensing data, and determines the temporary reference data having a relatively smaller representative value of the N number of difference values as the reference sensing data for the N number of first sensing data.

* * * * *